(12) United States Patent
Touchberry et al.

(10) Patent No.: US 11,255,672 B2
(45) Date of Patent: Feb. 22, 2022

(54) SYSTEM HAVING AN EXTENDED LIFE HIGH PERFORMANCE SENSOR

(71) Applicant: Honeywell International Inc., Morris Plains, NJ (US)

(72) Inventors: Alan Bruce Touchberry, Saint Louis Park, MN (US); Dean Eivind Johnson, Orono, MN (US)

(73) Assignee: Honeywell International Inc., Charlotte, NC (US)

( * ) Notice: Subject to any disclaimer, the term of this patent is extended or adjusted under 35 U.S.C. 154(b) by 291 days.

(21) Appl. No.: 16/665,971

(22) Filed: Oct. 28, 2019

(65) Prior Publication Data

US 2021/0123738 A1 Apr. 29, 2021

(51) Int. Cl.
*G01P 3/00* (2006.01)
*G01C 19/66* (2006.01)
*G01P 21/00* (2006.01)

(52) U.S. Cl.
CPC .............. *G01C 19/662* (2013.01); *G01P 3/00* (2013.01); *G01P 21/00* (2013.01)

(58) Field of Classification Search
CPC ......... G01P 3/00; G01P 21/00; G01C 19/662; G01C 19/5776; G01C 25/005; G01C 19/66; G01C 21/18; G01C 21/3415
See application file for complete search history.

(56) References Cited

U.S. PATENT DOCUMENTS

| | | | |
|---|---|---|---|
| 6,654,685 B2 | 11/2003 | McIntyre | |
| 8,151,475 B2 | 4/2012 | Albo et al. | |
| 8,255,161 B2 | 8/2012 | Bye | |
| 2012/0059575 A1 | 3/2012 | Hartman et al. | |
| 2013/0181086 A1 | 7/2013 | Bielas et al. | |
| 2013/0211723 A1* | 8/2013 | Weston | G01P 21/00 702/6 |

FOREIGN PATENT DOCUMENTS

| | | |
|---|---|---|
| EP | 2685212 A2 | 1/2014 |
| WO | 2016107806 A1 | 7/2016 |

OTHER PUBLICATIONS

European Patent Office, "Extended European Search Report from EP Application No. 20199485.2", from Foreign Counterpart to U.S. Appl. No. 16/665,971, filed Mar. 18, 2021, pp. 1 through 9, Published: EP.

\* cited by examiner

*Primary Examiner* — Abdullahi Nur
(74) *Attorney, Agent, or Firm* — Fogg & Powers LLC

(57) ABSTRACT

A system that includes a high performance sensor to provide accurate measurements and at least one dissimilar sensor that is less accurate. The at least one dissimilar sensor is of a different type of sensor than the high performance sensor while providing a same type of measurement as the high performance sensor. The at least one dissimilar sensor has a longer life expectancy than the high performance sensor. An at least one controller is configured to start both the high performance sensor and the at least one dissimilar sensor at startup of the system, to turn off the high performance sensor after a select period of time, and to output measurement data based on measurements of the high performance sensor while the high performance sensor is on and output the measurement data based on the at least one dissimilar sensor when the high performance sensor is off.

20 Claims, 6 Drawing Sheets

SYSTEM HAVING AN EXTENDED LIFE HIGH PERFORMANCE SENSOR

BACKGROUND

A gyroscope may be used as a navigational aid. Gyroscopes measure orientation and angular velocity. In an aircraft application, these measurements provide vital information used to safely operate the aircraft as it traverses through its travel path. There are several different types of gyroscopes that are used for aircraft navigation. Two example types include a ring laser gyroscope (RLG) and a microelectromechanical system (MEMS) gyroscope. A RLG has excellent run-to-run stability but its life expectancy is less than the life expectancy of an aircraft. Other types of sensors, such as MEMS gyroscopes, have a good angle random walk (ARW) and good in-run bias stability but poorer run-to-run stability. ARW is a velocity error build up over time due to noise. An in-run bias stability is a measure of a random variation in bias computed over a specified sample time and averaging time interval. A run-to-run (or the turn-on to turn-on) stability is a residual output error that occurs after calibration and internal compensation that is caused by at least the effects of turn-ons, turn-offs, time and temperature variations. Currently a suitable very long life self-aligning gyroscope system can therefore not be made by either technology type.

SUMMARY

The following summary is made by way of example and not by way of limitation. It is merely provided to aid the reader in understanding some of the aspects of the subject matter described. Embodiments provide a system that selectively incorporates a high performance sensor and at least one dissimilar sensors at select times during operation of the system to extend the life of the high performance sensor.

In one embodiment, a system that includes a high performance sensor, at least one dissimilar sensor and at least one controller is provided. The high performance sensor is used to provide accurate measurements. The at least one dissimilar sensor is of a different type of sensor than the high performance sensor while providing a same type of measurement as the high performance sensor. The at least one dissimilar sensor is less accurate than the high performance sensor and has a longer life expectancy than the high performance sensor. The at least one controller is in communication with the high performance sensor and the at least one dissimilar sensor. The at least one controller is configured to start both the high performance sensor and the at least one dissimilar sensor at startup of the system. The at least one controller is further configured to turn off the high performance sensor after a select period of time. The at least one controller is further configured to output measurement data based on measurements of the high performance sensor while the high performance sensor is on and output the measurement data based on the at least one dissimilar sensor when the high performance sensor is off.

In another example embodiment, another gyroscope system including a ring laser gyroscope (RLG) to provide rate/angle measurements, a plurality of dissimilar sensors and at least one controller is provided. Each dissimilar sensor is of a different type of sensor than the RLG that also provides rate/angle measurements. The at least one controller is in communication with the RLG and the plurality dissimilar sensors. The at least one controller is configured to start both the RLG and the plurality of dissimilar sensors at startup of the gyroscope system. The at least one controller is further configured to turn off the RLG after a select period of time. The at least one controller is further configured to output rate/angle measurements based on the RLG while the RLG is on and output rate/range data based on the plurality of dissimilar sensor when the RLG is turned off. The at least one controller is further configured to determine bias errors between an output of the RLG and the plurality of dissimilar sensors when the RLG is on and calibrate rate/rage data from the plurality of dissimilar sensors based on the determined bias errors when the RLG is turned off.

In yet another embodiment, a method of operating a gyroscope system is provided. The method includes turning on a ring laser gyroscope (RLG) and at least one dissimilar sensor, each dissimilar sensor being of a different type of sensor than the RLG that also provides rate/angle measurements; using the rate/angle measurements of the RLG when the RLG is on; determining bias errors associated with rate/angle measurements of the at least one dissimilar sensor; storing calibration information based on the bias errors in an memory; turning off the RLG; and calibrating the rate/angle measurements from the at least one dissimilar sensor based on the stored calibration information.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a system that improves the life expectancy of a high performance sensor. Systems described herein include the high performance sensor and at least one dissimilar sensor. The at least one dissimilar sensor provides the same type of measurements as the high performance sensor but is typically not as accurate as the high performance sensor. Further, the at least one dissimilar sensor may have a longer life expectancy than the high performance sensor. The life expectancy of the high performance sensor is extended in embodiments by selectively turning off the high performance sensor during periods of a vehicle mission where measurements from the at least one dissimilar sensor can be safely used. Vehicle applications in which the system may be incorporated in, include but are not limited to, cars, trucks, boats, aircraft, spacecraft etc. Systems described herein may be applied in vehicles where the vehicles mission is longer than the life expectancy of the high performance sensor or where the vehicle has a longer life expectancy than the high performance sensor.

Embodiments are describe hereafter as applying to the example embodiment of a gyroscope system that selectively incorporates a ring laser gyroscope (RLG) (an example high performance sensor) and at least one other dissimilar sensor, such as but not limited to, a microelectromechanical system (MEMS) gyroscope at select times to extend the life of the RLG. In particular, in some embodiments, the gyroscope system only uses the accurate sensor (RLG) long enough to overcome the run-to-run repeatability issues of the other dissimilar sensors. The RLG is then shut off to limit the amount of time the RLG is used. The gyroscope system is just one example of a system that may implemented. Any system that requires a high performance sensor whose expected life is less than the expected life of an associated vehicle or has an expected life less than a vehicle mission may implement systems described herein. Hence, embodiments are not just limited to gyroscope systems.

Figure 1:
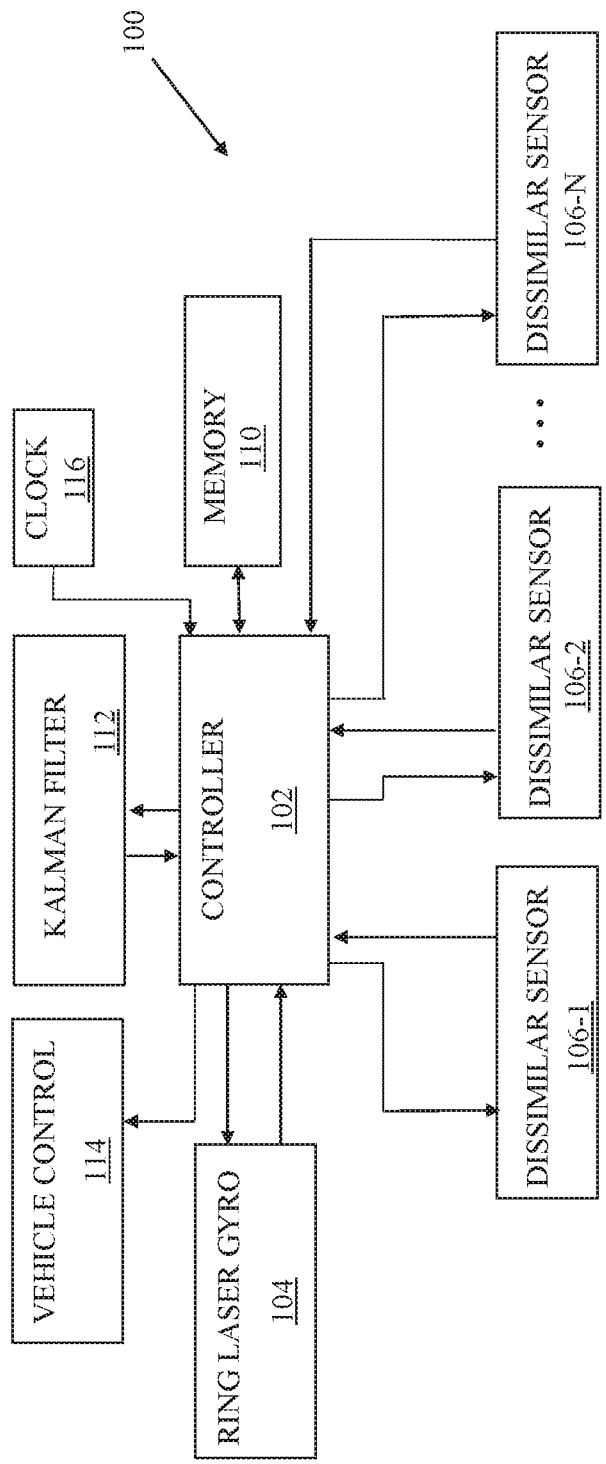
FIG. 1 is a block diagram of a gyroscope system according to one exemplary embodiment.

Referring to FIG. 1, a block diagram of gyroscope system 100 of one example is illustrated. The gyroscope system 100 is illustrated as including a controller 102, a memory 110, a RLG 104 (high performance sensor), a plurality of dissimilar sensors 106-1 through 106-N, a Kalman filter 112, a vehicle control 114 and a clock 116. The dissimilar sensors 106-1 through 106-N may be other types of gyroscopes, such as MEMS gyroscopes, or other devices that provide orientation and angular velocity information. The vehicle control 114 may be a vehicle system that uses the measurements, generally described as rate/angle measurements, from the gyroscope system 100 to at least display or even control aspects of the vehicle based on the rate/angle measurements from the gyroscope system 100 for navigation reasons. The clock 116 is used by the controller 102 to at least track the time the RLG 104 is on in one example embodiment.

In general, the controller 102 may include any one or more of a processor, microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The controller may be part of a system controller or a component controller. The memory 110 may include computer-readable operating instructions that, when executed by the controller provides functions of the gyroscope system 100. Such functions may include the functions of turning on and off the RLG 104 as described below. The computer readable instructions may be encoded within the memory 110. Memory 110 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 2:
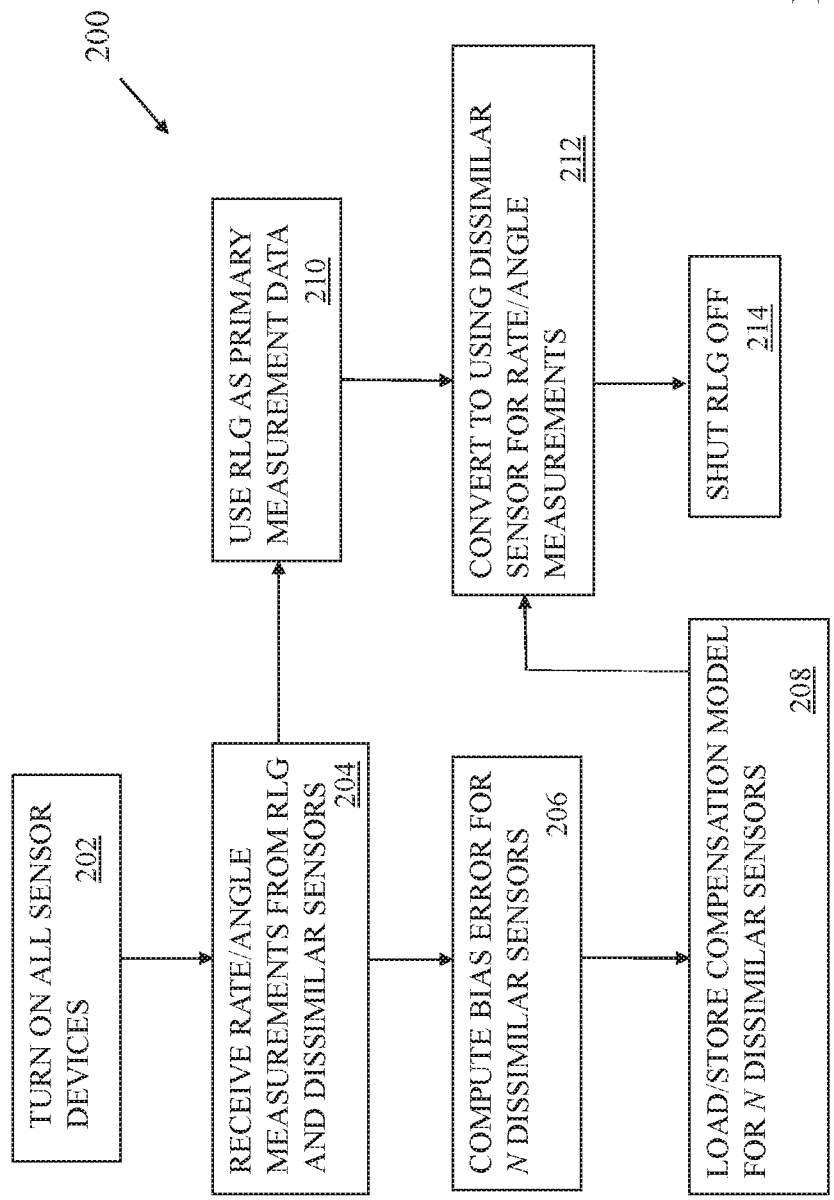
FIG. 2 illustrates an operational gyroscope system flow diagram according to one exemplary embodiment.

FIG. 2 illustrates an operational gyroscope system flow diagram 200 of an example embodiment. The flow diagram 200 is provided as a series of sequential blocks. The order and even the content may be different in other embodiments. Hence embodiments are not limited the sequence and content illustrated in the example flow diagram of FIG. 2.

The process starts in the operational gyroscope system flow diagram 200 by turning on all of the sensor devices at block (202). All the sensors devices include the RLG 104 and the dissimilar sensors generally indicated as 106. The controller 102 then receives all the sensor or measurement data that includes the rate/angle measurements, in the gyroscope system embodiment, from the RLG 104 and the dissimilar sensors 106. The controller 102, based on instructions stored in the memory 110, uses the rate/angle measurements of the RLG data as primary measurement data at block (210) while the RLG 104 is on.

Further, a bias error for N dissimilar sensors is computed at block (206) by the controller 102. A compensation model based on the bias error for each dissimilar sensor 106 is loaded on and stored in the memory 110 at block (208) in this example embodiment. In one embodiment the compensation model is based on a comparison of measurement outputs of the dissimilar sensors 106 with measurement outputs of the RLG 104. At block (212), the controller 102 converts to using the dissimilar sensor measurement outputs for rate measurements using the compensation module stored in the memory 110. The RLG 104 is then shut off at block (214).

Figure 3:
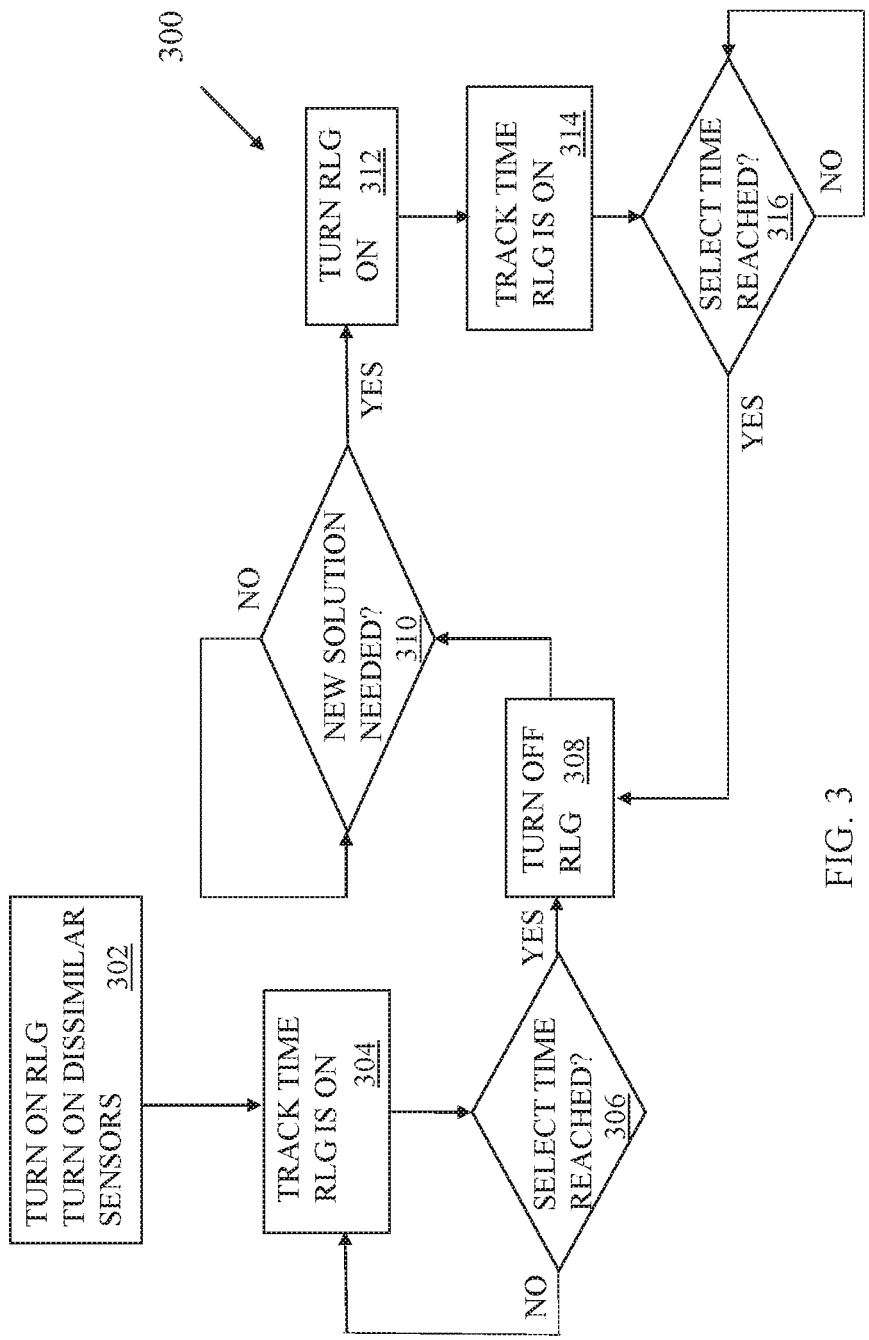
FIG. 3 illustrates a timing flow diagram according to one exemplary embodiment.

An example of a timing flow diagram 300 of an example embodiment is illustrated in FIG. 3. The flow diagram 300 is provided as a series of sequential blocks. The order and even the content may be different in other embodiments. Hence embodiments are not limited the sequence and content illustrated in the example flow diagram of FIG. 3.

In this example embodiment, both the RLG 104 and the dissimilar sensors are turned on at block (302). The time the RLG is on is tracked at block (304). Once it is determined at block (306) that the select time is reached, the RLG 104 is turned off at block (308). In one embodiment the time period is a period that is long enough to overcome the run-to-run repeatability issues of the dissimilar sensors 106.

In one embodiment both the dissimilar sensors 106 and RLG 104 are turned on at the start of a "day." Upon start up the RLG 104 self-aligns and provides data to calibrate the dissimilar sensors biases to ~0.002 to 0.003 deg/hr for a select initial calibration period of time. For example the select period of time may be a first hour of operation. The RLG 104 is then shut off and the dissimilar sensors 106 is used to navigate for the rest of the "day." Using this system, for a 15-hour day, the RLG 104 useful life may be extended by 15×. This system not only addresses dissimilar sensor run-by-run bias repeatability issues (such as MEMS run-by-run bias repeatability issues), it extends the life the RLG 104.

In an example embodiment, a Kalman filter 112 may be used during the select calibration period of RLG operation to determine the bias error of the dissimilar sensors 106. After that time, calibrated (adjusted) rate/angle measurements from the dissimilar sensors 106 based on the determined bias errors is used for the remainder of the "day" and shut the RLG 112 is shut off.

Further in embodiments, the RLG 104 may be turned on at any time for a period of time to provide a fresh solution (update calibration information) to add fault tolerance or detection to the gyroscope system 100. This is further illustrated in the timing flow diagram of FIG. 3. At block (310) it is determined if a new solution at block (310) is needed. In an embodiment, the need for a new solution is a need for a new compensation model (or calibration information) stored in memory 110 as described above in FIG. 2. If a new solution is needed, the RLG 104 is turned on at block (312). The time the RLG 104 is on is tracked at block (314). Once it is determined at block (316) that a select time is reached, the RLG 104 is turned off. The operating time of the RLG 104 may be variable depending upon the ARW of the RLG 104 and the level of bias uncertainty needed for the dissimilar sensors.

Figure 4:
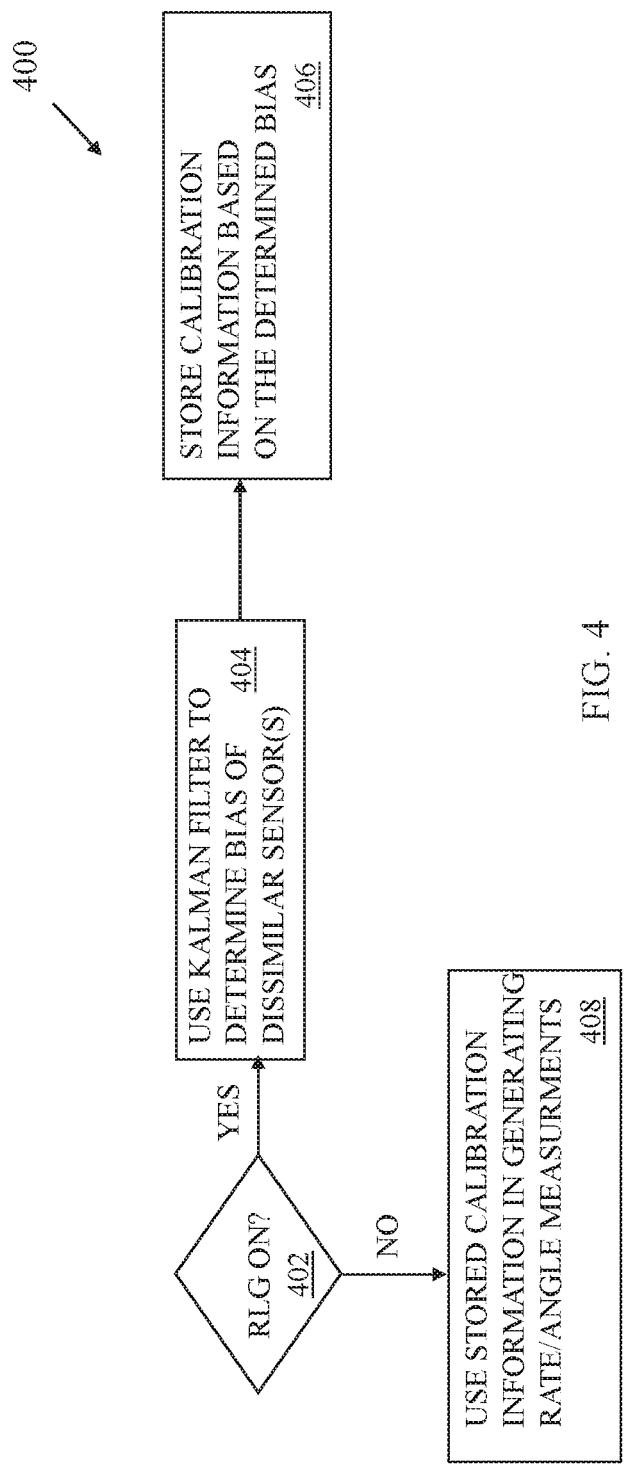
FIG. 4 illustrates a solution determination flow diagram according to one exemplary embodiment.

An example of an application of the Kalman filter is illustrated in a solution determination flow diagram 400 of FIG. 4. The flow diagram 400 is provided as a series of sequential blocks. The order and even the content may be different in other embodiments. Hence embodiments are not limited the sequence and content illustrated in the example flow diagram of FIG. 4.

The process starts a block (402) where it is determined if the RLG 104 is on. If it is on, the process uses the Kalman filter 112 at block (404) to determine bias error associated with the dissimilar sensor measurements. Calibration information that is based on the determined bias errors is stored the memory 110 at block (406). If the RLG is not on as determined by block (402), the stored calibration information is used in generating rate/angle measurements from the dissimilar sensor(s) at block (408).

Figure 5:
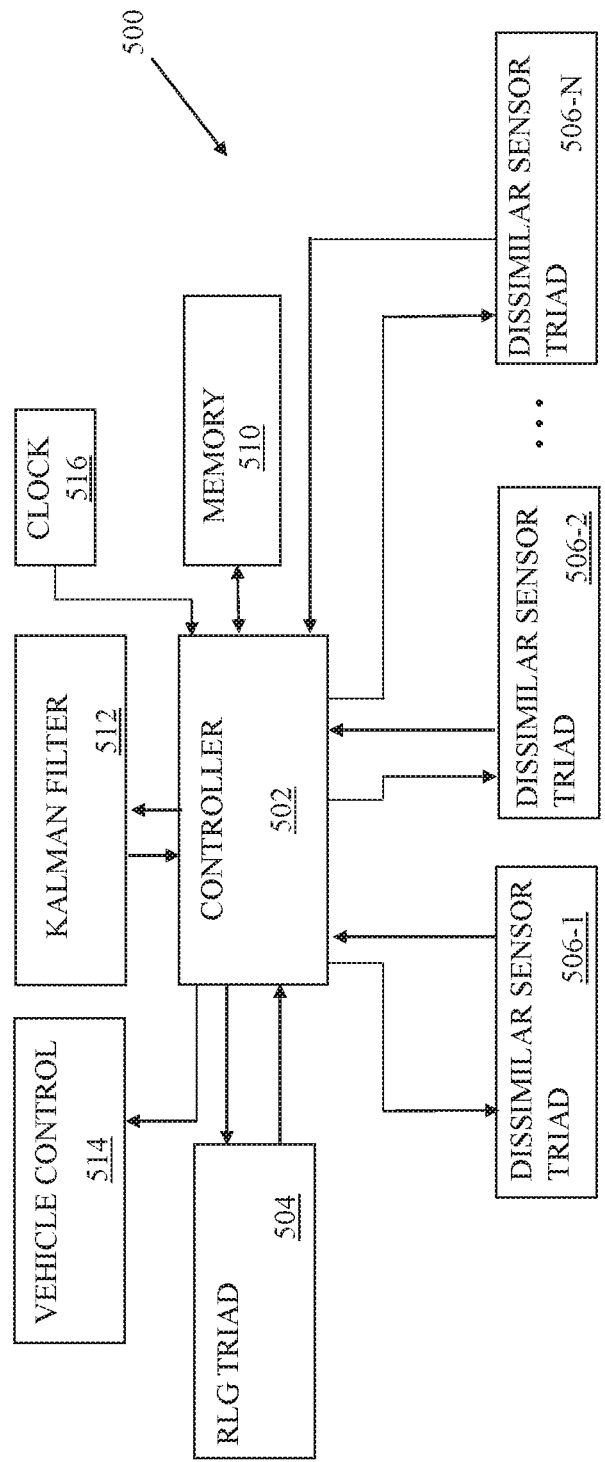
FIG. 5 is a block diagram of another gyroscope system according to one exemplary embodiment.

Embodiments may also be applied to sensor triads as illustrated in FIG. 5. The sensor triad gyroscope system 500 example of FIG. 5. This gyroscope system 500 is illustrated as including a RLG triad 504, a plurality of dissimilar sensor triads 106-1 through 106-N Kalman, a filter 512, a vehicle control 514 and a clock 516. The dissimilar sensor triads maybe other types of gyroscope triads including MEMS triads that provide orientation and angular velocity information. Similar to the embodiment of FIG. 1, this embodiment includes a controller 502 and a memory 510 to perform at least the functions described above regarding the embodiment described in the FIG. 1.

Figure 6:
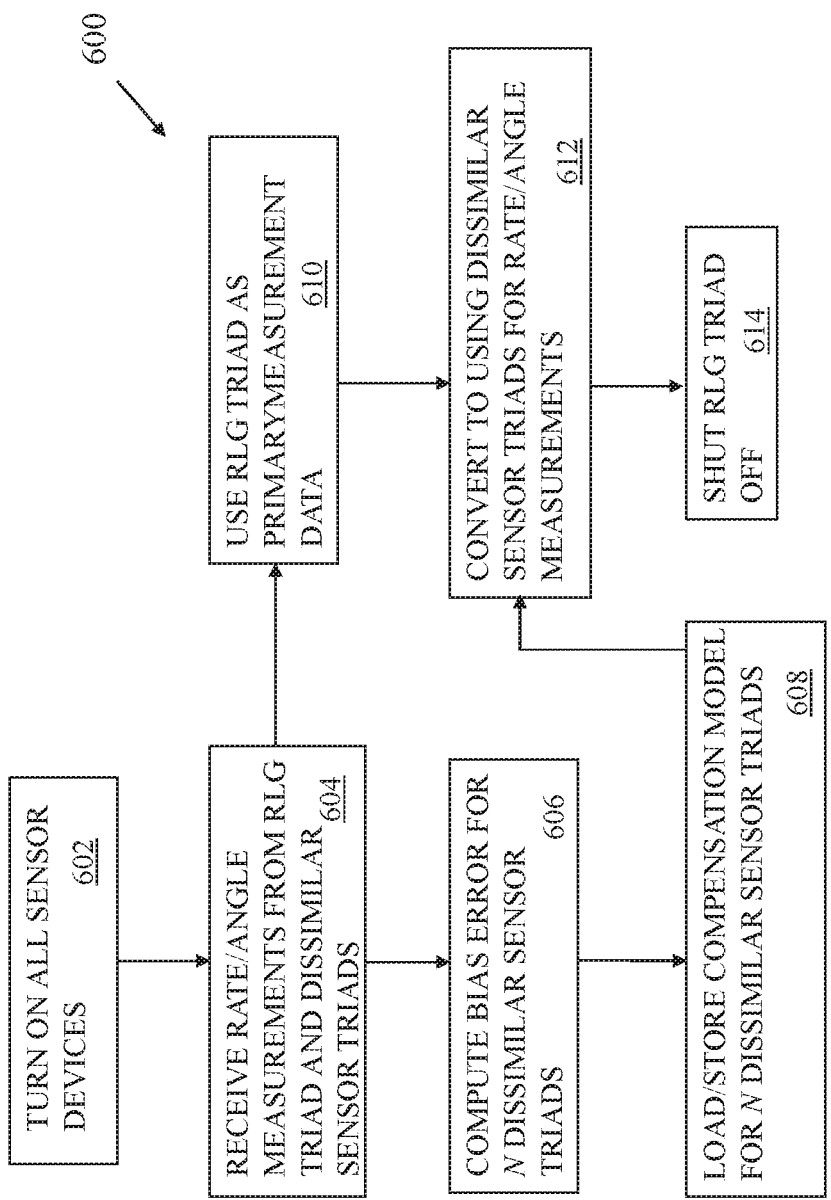
FIG. 6 illustrates an operational triad gyroscope system flow diagram according to one exemplary embodiment.

FIG. 6 illustrates an operational triad gyroscope system flow diagram 600 of an example embodiment. The flow diagram 600 is provided as a series of sequential blocks. The order and even the content may be different in other embodiments. Hence embodiments are not limited the sequence and content illustrated in the example flow diagram of FIG. 2.

The process starts in the operational gyroscope system flow diagram 600 by turning on all of the sensor devices at block (602). All the sensors devices include the RLG triad 504 and the dissimilar sensors triads generally indicated as 506. The controller 502 then receives all the sensor data that includes rate/angle measurements from the triad RLG 504 and the dissimilar sensor triads 506. The controller 502 at block (604), based on instructions stored in the memory 510, the controller 502 uses the RLG data as primary data at block (610) while the RLG 504 is on.

The controller 502 at block (606) computes a bias error for N dissimilar sensor triads. The bias error for N dissimilar sensor triads is stored in the memory at block (608). As described above, in an embodiment calibration information based on the bias error is stored in the memory. At block (612) data from the N dissimilar sensor triads 506 is converted for use using the computed bias error. The RLG Triad is then shut off at block (614). The converted measurements from the N dissimilar sensor triads 506 are then used by the gyroscope system 500 while the RLG triad 504 is turned off.

EXAMPLE EMBODIMENTS

Example 1 is a system that includes a high performance sensor, at least one dissimilar sensor and at least one controller. The high performance sensor is used to provide accurate measurements. The at least one dissimilar sensor is of a different type of sensor than the high performance sensor while providing a same type of measurement as the high performance sensor. The at least one dissimilar sensor is less accurate than the high performance and has a longer life expectancy than the high performance sensor. The at least one controller is in communication with the high performance sensor and the at least one dissimilar sensor. The at least one controller is configured to start both the high performance sensor and the at least one dissimilar sensor at startup of the system. The at least one controller is further configured to turn off the high performance sensor after a select period of time. The at least one controller is further configured to output measurement data based on measurements of the high performance sensor while the high performance sensor is on and output the measurement data based on the at least one dissimilar sensor when the high performance sensor is off.

Example 2 includes the system of Example 1, wherein the high performance sensor has a life expectancy that is less than at least one of a life expectancy of the at least one dissimilar sensor and a mission of a vehicle implementing the high performance senor.

Example 3 includes the system of any of the Examples wherein in the high performance sensor is a ring laser gyroscope (RLG) and the measurements are rate/angle measurements.

Example 4 includes the system of Example 3, wherein the at least one controller is further configured to determine bias errors between the rate/angle measurements of the RLG and the rate/angle measurements of the at least one dissimilar sensor when the RLG is on and convert rate/angle measurements of the at least one dissimilar sensor using the determined bias errors when the RLG is turned off.

Example 5 includes system of Example 4, further including at least one Kalman filter used by the at least one controller to determine the bias error, the at least one controller is configured to use an estimated solution from the Kalman filter when the RLG is turned off and use the estimated solution to calibrate outputs of the at least one dissimilar sensor.

Example 6 includes the system of Example 5, further including a memory to store calibration information based on the determined bias errors, the at least one controller in communication with the memory.

Example 7 includes the system of Example 6, wherein the at least one controller is further configured to turn on the RLG periodically to update calibration information.

Example 8 includes the system of the Examples 1-7, further including a clock. The at least one controller is in communication with the clock to track how long the high performance sensor is on.

Example 9 includes the system of any of the Examples 1-8, wherein the select period of time is the time needed to overcome run-to-run repeatability issues of the at least one dissimilar sensor.

Example 10 is a gyroscope system including a ring laser gyroscope (RLG) to provide rate/angle date, a plurality of dissimilar sensors and at least one controller. Each dissimilar sensor is of a different type of sensor than the RLG that also provides rate/angle measurements. The at least one controller is in communication with the RLG and the plurality dissimilar sensors. The at least one controller is configured to start both the RLG and the plurality of dissimilar sensors at startup of the gyroscope system. The at least one controller is further configured to turn off the RLG after a select period of time. The at least one controller is further configured to output rate/angle measurements based on the RLG while the RLG is on and output rate/range data based on the plurality of dissimilar sensor when the RLG is turned off. The at least one controller is further configured to determine bias errors between an output of the RLG and the plurality of dissimilar sensors when the RLG is on and calibrate rate/rage data from the plurality of dissimilar sensors based on the determined bias errors when the RLG is turned off.

Example 11 includes the gyroscope system of Example 10, further including a memory to store calibration information based on the bias error determinations. The at least one controller is in communication with the memory.

Example 12 includes the gyroscope system of any of the Examples 10-11, further including a clock. The at least one controller in communication with the clock. The at least one controller is configure to track how long the RLG is on.

Example 13 includes the gyroscope system of any of the Examples 10-12, wherein the select period of time is the time needed to overcome run-to-run repeatability issues of the at least one dissimilar sensor.

Example 14 includes the gyroscope system of any of the Examples 10-13, wherein the RLG is a RLG triad and each dissimilar sensor is a dissimilar sensor triad.

Example 15 is a method of operating a gyroscope system. The method includes turning on a ring laser gyroscope (RLG) and at least one dissimilar sensor, each dissimilar sensor being of a different type of sensor than the RLG that also provides rate/angle measurements; using the rate/angle measurements of the RLG when the RLG is on; determining bias errors associated with rate/angle measurements of the at least one dissimilar sensor; storing calibration information based on the bias errors in an memory; turning off the RLG; and calibrating the rate/angle measurements from the at least one dissimilar sensor based on the stored calibration information.

Example 16 includes the method of Example 15, further including applying a Kalman filter in determining the bias errors associated with the rate/angle measurements of the at least one dissimilar sensor.

Example 17 includes the method of Examples 16, wherein the Kalman filter uses rate/angle measurements from the RLG and the at least one dissimilar sensor in determining bias errors.

Example 18 includes the method of any of the Examples 15-17, wherein turning off the RLG further includes turning off the RLG after a select time has passed needed to overcome run-to-run repeatability issues of the at least one dissimilar sensor.

Example 19 includes the method of any of the Examples 15-18, further including turning the RLG back on to update the calibration information.

Example 20 includes the method of any of the Examples 15-19, wherein the RLG is a RLG triad and the at least one dissimilar sensor is at least one dissimilar sensor triad.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system comprising:
   a high performance sensor to provide accurate measurements;
   at least one dissimilar sensor, the at least one dissimilar sensor being of a different type of sensor than the high performance sensor while providing a same type of measurement as the high performance sensor, the at least one dissimilar sensor being less accurate than the high performance sensor and having a longer life expectancy than the high performance sensor; and
   at least one controller in communication with the high performance sensor and the at least one dissimilar sensor, the at least one controller configured to start both the high performance sensor and the at least one dissimilar sensor at startup of the system, the at least one controller further configured to turn off the high performance sensor after a select period of time, the at least one controller further configured to output measurement data based on measurements of the high performance sensor while the high performance sensor is on and output the measurement data based on the at least one dissimilar sensor when the high performance sensor is off.

2. The system of claim 1, wherein the high performance sensor has a life expectancy that is less than at least one of a life expectancy of the at least one dissimilar sensor and a mission of a vehicle implementing the high performance senor.

3. The system of claim 1, wherein in the high performance sensor is a ring laser gyroscope (RLG) and the measurements are rate/angle measurements.

4. The system of claim 3, wherein the at least one controller is further configured to determine bias errors between the rate/angle measurements of the RLG and the rate/angle measurements of the at least one dissimilar sensor when the RLG is on and convert rate/angle measurements of the at least one dissimilar sensor using the determined bias errors when the RLG is turned off.

5. The system of claim 4, further comprising:
   at least one Kalman filter used by the at least one controller to determine the bias error, the at least one controller is configured to use an estimated solution from the Kalman filter when the RLG is turned off and use the estimated solution to calibrate outputs of the at least one dissimilar sensor.

6. The system of claim 5, further comprising:
   a memory to store calibration information based on the determined bias errors, the at least one controller in communication with the memory.

7. The system of claim 6, wherein the at least one controller is further configured to turn on the RLG periodically to update calibration information.

8. The system of claim 1, further comprising:
   a clock, the at least one controller in communication with the clock to track how long the high performance sensor is on.

9. The system of claim 1, wherein the select period of time is the time needed to overcome run-to-run repeatability issues of the at least one dissimilar sensor.

10. A gyroscope system comprising:
a ring laser gyroscope (RLG) to provide rate/angle measurements;
a plurality of dissimilar sensors, each dissimilar sensor being of a different type of sensor than the RLG that also provides rate/angle measurements; and
at least one controller in communication with the RLG and the plurality dissimilar sensors, the at least one controller configured to start both the RLG and the plurality of dissimilar sensors at startup of the gyroscope system, the at least one controller further configured to turn off the RLG after a select period of time, the at least one controller further configured to output rate/angle measurements based on the RLG while the RLG is on and output rate/range data based on the plurality of dissimilar sensor when the RLG is turned off, the at least one controller is further configured to determine bias errors between an output of the RLG and the plurality of dissimilar sensors when the RLG is on and calibrate rate/angle measurements from the plurality of dissimilar sensors based on the determined bias errors when the RLG is turned off.

11. The gyroscope system of claim 10, further comprising:
a memory to store calibration information based on the bias error determinations, the at least one controller in communication with the memory.

12. The gyroscope system of claim 10, further comprising:
a clock, the at least one controller in communication with the clock, the at least one controller configure to track how long the RLG is on.

13. The gyroscope system of claim 10, wherein the select period of time is the time needed to overcome run-to-run repeatability issues of the at least one dissimilar sensor.

14. The gyroscope system of claim 10, wherein the RLG is a RLG triad and each dissimilar sensor is a dissimilar sensor triad.

15. A method of operating a gyroscope system, the method comprising:
turning on a ring laser gyroscope (RLG) and at least one dissimilar sensor, each dissimilar sensor being of a different type of sensor than the RLG that also provides rate/angle measurements;
using the rate/angle measurements of the RLG when the RLG is on;
determining bias errors associated with the rate/angle measurements of the at least one dissimilar sensor;
storing calibration information based on the bias errors in an memory;
turning off the RLG; and
calibrating the rate/angle measurements from the at least one dissimilar sensor based on the stored calibration information.

16. The method of claim 15, further comprising:
applying a Kalman filter in determining the bias errors of the rate/angle measurements of the at least one dissimilar sensor.

17. The method of claim 16, wherein the Kalman filter uses rate/angle measurements from the RLG and the at least one dissimilar sensor in determining bias errors.

18. The method of claim 15, wherein turning off the RLG further comprises:
turning off the RLG after a select time has passed needed to overcome run-to-run repeatability issues of the at least one dissimilar sensor.

19. The method of claim 15, further comprising:
turning the RLG back on to update the calibration information.

20. The method of claim 15, wherein the RLG is a RLG triad and the at least one dissimilar sensor is at least one dissimilar sensor triad.

* * * * *